(12) United States Patent  (10) Patent No.: US 8,745,729 B2
Poluri et al.  (45) Date of Patent: Jun. 3, 2014

(54) PREVENTING ABUSE OF SERVICES THROUGH INFRASTRUCTURE INCOMPATIBILITY

(75) Inventors: Ravi Kiran R. Poluri, Sammamish, WA (US); Weisheng Li, Bothell, WA (US); Usman A. Shami, Bellevue, WA (US); Wei-Quiang Michael Guo, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 654 days.

(21) Appl. No.: 12/821,117

(22) Filed: Jun. 22, 2010

(65) Prior Publication Data

US 2011/0314540 A1 Dec. 22, 2011

(51) Int. Cl.
G06F 7/04 (2006.01)
G06F 17/30 (2006.01)
G06F 12/00 (2006.01)
G06F 12/14 (2006.01)
G06F 13/00 (2006.01)
G11C 7/00 (2006.01)

(52) U.S. Cl.
USPC ................................. 726/21; 726/2

(58) Field of Classification Search
USPC ...................................... 726/21, 2
See application file for complete search history.

(56) References Cited

U.S. PATENT DOCUMENTS 7,664,819 B2  2/2010  Murphy et al.
2004/0073811 A1  4/2004  Sanin
2007/0140117 A1  6/2007  Zhou et al.
2008/0127302 A1*  5/2008  Qvarfordt et al. ................ 726/2
2011/0292031 A1*  12/2011  Zhu et al. ...................... 345/419

OTHER PUBLICATIONS

Animierte CAPTCHAs http://www.animierte-captcha.de/ Internet arcdhive image Dec. 8, 2006.*
Computers beat Humans at Single Character Recognition in Reading based Human Interaction Proofs (HIPs) Kumar Chellapilla, Kevin Larson, Patrice Simard, Mary Czerwinski 2005.*
Re: CAPTCHAs—Understanding CAPTCHA-Solving Services in an Economic Context Jun. 2, 2010.*
Kadakia, Yash, "Automated Attack Prevention", retrieved at << http://www.acunetix.com/vulnerability-scanner/yashkadakia.pdf >>, Oct. 12, 2007, 15 pages.
"Around the CAPTCHA", Network Security Research and AI, retrieved at << http://network-security-research.blogspot.com/ >>, dated 2008, 19 pages.

(Continued)

*Primary Examiner* — Kambiz Zand
*Assistant Examiner* — Benjamin Kaplan
(74) *Attorney, Agent, or Firm* — Bryan Webster; Andrew Sanders; Micky Minhas

(57) ABSTRACT

Spammers, and other abusers of web services, may be deterred in their attempts to sign up for these services at large scale by making changes to the service registration procedure, where the changes are designed to break the spammer's infrastructure. In one example, a procedure to register for a web service involves presenting a Human Interaction Proof (HIP, or "captcha") to the user, and gating access to the service upon receipt of a correct solution. If spammers use botnets and/or image capture techniques to initiate registration processes and to transport the HIPs to human or automated solvers, then the registration procedure can be changed in a way that is incompatible with capturing these images, or in a way that is incompatible with receiving HIP solutions from someplace other than the location at which registration was initiated.

20 Claims, 4 Drawing Sheets

(56) References Cited

OTHER PUBLICATIONS

"How to Configure Anti-Spam Automatic Updates", retrieved at << http://technet.microsoft.com/en-us/library/bb125199%28EXCHG.80%29.aspx >>, dated Jan. 20, 2009, 3 pages.

"Welcome to Message Defence—The Managed Email Security and Business Anti Spam Service from HBP Systems", retrieved at << http://www.messagedefence.co.uk/ >>, dated Mar. 27, 2008, 2 pages.

"Managed/Hosted Anti-Spam Services", retrieved at << http://www.spamhelp.org/services/listings/managed-anti-spam/ >>, dated Apr. 11, 2008, 4 pages.

"Internet Security Adapter", retrieved at << ftp://ftp10.dlink.com/pdfs/products/DSD-150/DSD-150_ds.pdf >>, dated 2006, 2 pages.

\* cited by examiner

PREVENTING ABUSE OF SERVICES THROUGH INFRASTRUCTURE INCOMPATIBILITY

BACKGROUND

Spammers, and other abusers of Internet services, often use free web services as part of their business. For example, people who want to send spam e-mail often sign up for free e-mail accounts, or use free blogging services to host various aspects of their actions. The actions of these abusers can be detected after an account has been used in an abusive way. For example, sending a large number of e-mails per day, or sending e-mail with certain types of content, tends to suggest that an e-mail account is being used to send spam. After a certain amount of abusive activity has been detected, the account can be disabled. Since the accounts of suspected abusers are disabled quickly, abusers have to sign up for large numbers of accounts in order to carry out their plans at a large scale.

Since registration for web service is often gated by Human Interaction Proofs (HIPs—sometimes called "captchas"), people who want to sign up for large numbers of accounts have to find efficient ways to carry out the registration procedure. They can use Optical Character Recognition (OCR) engines or low-cost labor to solve HIPs. They can enlist "botnets"—i.e., machines infected with malware that is designed to carry out some or all of a registration procedure.

HIP schemes can be broken. For example, if an HIP scheme presents a challenge in the form of "type the text that you see," an OCR engine can be used to solve the HIP. The precise techniques for obscuring the text can be changed frequently in order to confound the OCR engine. For example, different types of backgrounds or distorting lines can be used to obscure the characters shown in the challenge. However, OCR engines can be trained to handle new HIP schemes. Moreover, when human labor is employed to solve HIPs, mere changes to the way in which characters are obscured may be ineffective at preventing abusers from solving the HIPs and performing the registration procedure.

SUMMARY

The procedures that spammers and other abusers use to sign up for web services may be thwarted by making changes to the registration procedure, so as to make the registration procedure incompatible with the infrastructure that the abusers use. For example, if a registration procedure uses a HIP of the form "type the text that you see," the techniques that the abusers use to solve the HIP at low cost may rely on capturing the image that contains the HIP challenge, sending the image to an OCR engine or human HIP solver, and relaying the solution directly to the registration server. Thus, the HIP scheme might be changed so that a simple image capture cannot be used.

For example, the HIP might be animated, which means that a program that is designed to capture a still image of the HIP and to send that image to an OCR engine or human solver can no longer be used. Or, the HIP challenge might be encoded in the form of a JavaScript (or other type of browser-executable program) that renders the challenge image inside the user's browser (rather than including a pre-rendered challenge in the registration page in the form of a GIF or JPEG), so that a simple image capture program would no longer be able to transmit the HIP challenge to an OCR engine or human solver. As another example, the HIP may be made interactive so that portions of the HIP are revealed in stages in response to human input. Or, as another example, many registration techniques used by abusers have the registration procedure initiated by an infected computer in a botnet, and have the solution transmitted directly to the registration server directly by the solver. If the registration server is configured to insist that the solution come from the same IP address that was used to initiate the registration, then the solution would have to be transmitted back to the botnet computer in order to submit the solution to the registration server. Such a configuration complicates the use of a botnet in the registration process.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
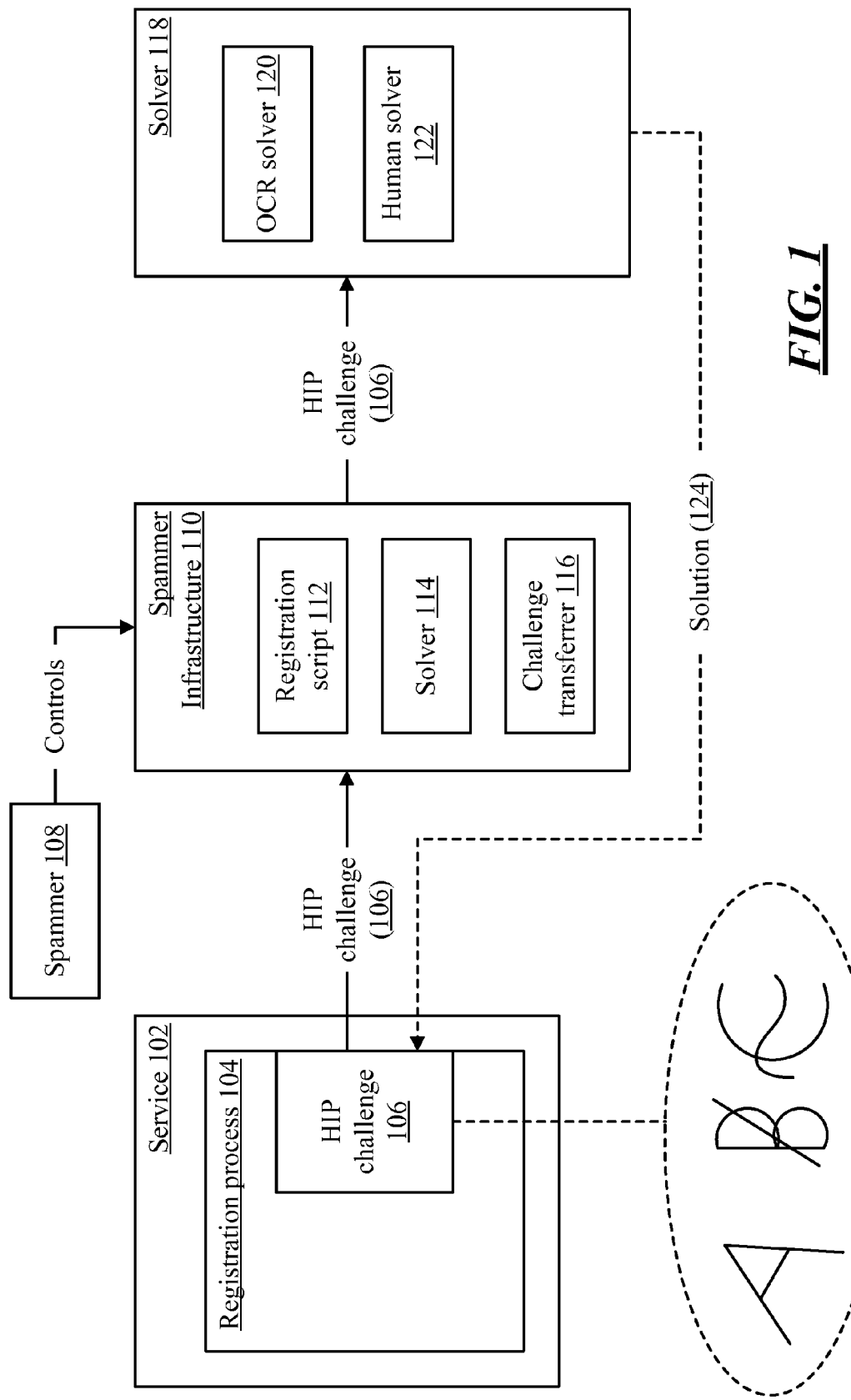
FIG. 1 is a block diagram of an example scenario in which a registration process may be performed.

Spammers, and other abusers, generally use free web services to host their abusive acts. For example, if someone wants to send spam e-mail on a large scale, he or she might sign up for a web-based e-mail account from which to send the spam e-mail. Or, the spammer might sign up for a blogging account, and include a link to the blog in the spam e-mail in order to host images or some other content related to the spam. When a person's abusive use of a web service has gone on for some amount of time, the abusive nature of the use is relatively easy to detect. For example, a person who sends a hundred e-mails per day to random addresses can generally be identified as a spammer, and the e-mail account can be disabled. Spammers generally deal with this problem by signing up for large numbers of e-mail accounts. However, signing up for an e-mail account involves going through a registration procedure on the web. In order to send spam on a large scale, a spammer would have to sign up for large numbers of accounts in order to keep pace with the speed at which those accounts can be disabled. It is generally not feasible for a spammer to register manually for the number of accounts that he or she would use.

In order to address this issue, spammers look for low cost ways to register for web service accounts. Some of these ways involve automation of the registration process; other ways involve enlisting low-cost labor in the registration process. However, both automation and human labor make use of an infrastructure. Many registration procedures are gated by a Human Interaction Proof (HIP—sometimes called a "captcha"), which is designed to verify that the entity performing the registration procedure is a human being, and not a robot. HIPs often take the form of showing the user a graphical representation of some letters and numbers and asking the user to type what he or she sees. The letters and numbers have been distorted or obscured in some way, on the theory that recognizing the distorted letters and numbers would be relatively easy for a human mind, but relatively difficult for a computer. However, even high-quality HIPs can be broken by attackers with sufficient will. Machine learning techniques can be used to train Optical Character Recognition engines (OCR) engines on increasingly complex HIP schemes. Additionally, there are places where human labor is relatively inexpensive. This source of labor can be used to solve HIPs inexpensively: solving hundreds of HIPs might cost as little as one dollar. However, initiating the registration process and transporting the HIP to an OCR engine or human HIP solver involves an infrastructure.

A typical infrastructure involves a "botnet". A botnet is a collection of machines that have been infected with malware, where the malware is designed to use the host machine in the service of the spammer's goals. Machines typically become infected with malware when a user visits certain web sites, when a user opens an infected e-mail attachment, or through other mechanisms. The "bots" installed on these machines can be used to initiate registration procedures for web services. Initiating registration in this way obscures the abusive nature of the registration, since the registration requests appear to be coming from arbitrary machines located all over the world—a pattern that, at first blush, appears to be consistent with ordinary legitimate users signing up for services. However, in order to prevent the bots from being detected and removed, the bots have to be relatively stealthy. Since solving HIPs (or training a solver on new data) is a computationally intensive process that might telegraph the existence of the bot, the act of solving the HIP generally is not performed by the bot directly. Rather, the bot simply initiates the registration procedure—possibly by entering basic information like a name and address into the text fields—and then captures the HIP to be sent to an OCR engine or human solver. The solution is then directed—from the server that runs the OCR engine or from the human solver—directly to the registration server. This process, however, assumes that the bot can accurately capture the HIP and can transport it somewhere else to be solved.

The process to capture and transport an HIP, however, makes certain assumptions about the nature of the HIP. For example, the bot might be designed to capture a still image in Graphics Interchange Format (GIF) or Joint Photographic Experts Group (JPEG) format. If the HIP is not presented as a still image in one of these formats, then the bot cannot effectively participate in the registration scheme. Additionally, many registration servers are configured to accept the solution to the HIP, regardless of whether the HIP comes from the same Internet Protocol (IP) address as the one from which the registration procedure was initiated. If the registration server is configured to insist, as a condition for successful registration, that the solution be received from the same place where the registration procedure was initiated, this condition complicates the use of bots to initiate the registration procedure. Either the bots would have to be configured with OCR engines to solve captchas, or the registration procedure would have to be centralized. Any change to the HIP scheme (or to some other part of the registration scheme) that is incompatible with the spammer's existing infrastructure can thwart (or at least slow down) the spammer's ability to register for web services at large scale.

The subject matter described herein may be used to complicate an abuser's attempts to register for web services by breaking the abuser's infrastructure. In order to thwart the abuser's registration process, some aspect of the infrastructure of that process is identified, either by research or by surmise. The registration procedure offered by the provider of the web service is then changed in some way that is incompatible with that infrastructure. For example, if the abuser's registration infrastructure relies on capturing a still image, then an HIP scheme can be changed to animate the HIP, or to present the HIP in the form of a video. Or, the HIP can be implemented in the form of a JavaScript (or some other type of program script) that uses the browser to render the HIP challenge, so that capturing the HIP would involve recognizing and understanding the script. Or, the HIP can be made interactive—e.g., the characters of a captcha challenge might be presented one-by-one, so that the entire captcha cannot be transported to an OCR engine or human solver as a single unit. Or, the registration server might be configured to insist that the HIP solution come from the IP address from which the registration procedure was initiated which, as noted above, complicates the use of decentralized botnets.

Turning now to the drawings, FIG. 1 shows an example scenario in which a registration process may be performed by a spammer or other abuser. Service 102 may be an e-mail service, a blogging service, or other web service to which a spammer may want to gain access. Service 102 provides a registration process 104, through which a user registers for the service. For example, registration process 104 may allow a user to sign up for a new e-mail account with an e-mail service. Service 102 may be implemented by a remote web server (or a remote cluster of web servers), and registration process 104 may be open to anyone who can communicate with the server(s) that host service 102.

The operator of service 102 may want to limit use of service 102 to legitimate users, and to turn away illegitimate users. The operator of service 102 may deploy a HIP challenge 106 as part of the registration process. The theory behind HIP challenge 106 is that a large-scale abuser would not be able to devote the human time and/or labor to carrying out registration process 104 at the scale and/or volume that he wants, and thus may fully or partially automate the act of using registration process 104. HIP challenge 106 is designed to be relatively easy for a human to solve, and relatively difficult for a machine to solve. In the example of FIG. 1, HIP challenge 106 is shown in the dotted-line ellipse as a series of letters obscured or distorted in various ways (e.g., A is skewed, B and C are covered by extraneous lines); however, HIP challenge 106 could take any appropriate form. Thus, by making HIP challenge 106 part of registration process 104, the operator of service 102 hopes to differentiate between human users who complete registration process 104 (who are, by and large, legitimate users), and robots that complete registration process 104 (who are, by and large, acting in the service of spammers).

Spammer 108 is a person or other entity who would like to obtain access to service 102. Spammer 108 would like to defeat HIP challenge 106 in order to register for service 102 (possibly on a massive scale, such as by signing up for many different accounts). Spammer 108 controls a spammer infrastructure 110, which is used to carry out registration process 104 on spammer 108's behalf. Spammer infrastructure 110 may comprise various elements. For example, spammer infrastructure may include a registration script 112 that operates the registration web site and fills in the fields of whatever web forms are presented by registration process 104. Spammer infrastructure 110 may also include a solver 114, which solves HIP challenges, and/or a challenge transferrer 116 that transfers HIP challenges to another solver 118. Solver 114 may take the form of an OCR engine that reads HIP challenges and attempts to find a solution to the challenge. Challenge transferrer 116 may be a component that attempts to identify the HIP challenge 106 in a registration process, and transfers HIP challenge 106 to solver 118.

Solver 118 may be part of spammer infrastructure 110, but may be remote from other parts of that infrastructure. For example, spammer infrastructure 110 may include a diffuse botnet that uses many different computers to initiate the registration process, and solver 118 may be a central server, or a source of human labor, that is distinct from the botnet computers and that solves challenges transferred to it by transferrer 116. Thus solver 118 may comprise an OCR solver 120 (e.g., a program that runs on a server and that solves HIPs through optical character recognition). Or, solver 118 may comprise a human solver 122, who sits in front of a computer screen and types the solutions to HIP challenges that are presented on the screen. Thus, in one example, spammer infrastructure 110 comprises a botnet of infected machines that initiate a registration process and that capture HIP challenges to be transferred to solver 118. In that example, registration script 112 and challenge transferrer 116 may run on machines in the botnet. In this way, registration can be initiated by the bots, but transferrer 116 can transfer the HIP challenges to solver 118, so that the solutions to these challenges can be worked out by solver 118.

At some point, a solution to HIP challenge 106 is generated by spammer infrastructure 110. The solution may or may not be correct, and many spammers are content to solve, for example, five percent of all HIP challenges correctly, since the cost of submitting a wrong answer and having to try again is relatively low. The solution may be transmitted to service 102 in various ways. For example, solver 118 might submit solution 124 directly to registration process 104. Or, solver 118 might submit solution 124 to a machine in the botnet (e.g., the machine that initiated the registration process), whereupon that machine submits the solution to registration process 104, although this technique is generally more difficult for a spammer to implement than simply passing the solution directly from the solver to registration process 104. In some cases, registration process 104 may not be attuned to where the solution comes from, and thus may accept the solution to the HIP challenge from any location. In another example, registration process 104 might insist that the solution come from the same location (e.g., the same IP address) that was used to initiate the registration.

As noted above, one aspect of the subject matter herein is to design a HIP challenge, or other part of the registration process, that is incompatible with the existing spammer infrastructure. Designing the registration process in this way involves creating some facet of the registration process that cannot be accommodated by elements of the infrastructure. Thus, in order to explain what constitutes such incompatibility, we turn to a discussion of some example aspects of a spammer infrastructure 110. These examples are described in connection with FIG. 2.

One aspect of a spammer infrastructure is its ability to capture images (block 202). As described above, spammers often carry out registration procedures by having bots in a botnet capture an HIP challenge and send the HIP challenge to OCR solvers or human solvers. There are various ways to show an image, and the image-capture ability of infrastructure 110 may work with certain types of images but not others. For example, images may be still images or moving images. Capturing moving images presents different issues from capturing still images. The problem of capturing a moving image from a registration page might not be insurmountable, but existing infrastructure 110 may or may not have a way to capture a moving image. If not, then changing the display of a HIP challenge from a still image to a moving image (or other type of non-still image) may be incompatible with infrastructure 110.

An issue that is related to, but more general than, image capture is that the infrastructure may incorporate assumptions about how a HIP challenge is presented (block 204). In a sense, the notion that a HIP could be captured as a still image is an example of such an assumption. However, there are other examples of assumptions about how an image could be captured. For example, even in the case where a HIP challenge is presented as a still image, the image could be presented as a GIF or JPEG file, or might be described in the form of a JavaScript that the browser executes in order to draw the image. Capturing a GIF or JPEG image presents different types of issues from capturing a script that draws an image. Thus, infrastructure 110 might be built on the assumption that a captcha will be a GIF or JPEG, and such an infrastructure can be confounded by presenting the image in a different way (e.g., through a script).

Another example assumption about how a HIP challenge is presented is an assumption that the entire challenge will be presented at once without further user interaction. Such an assumption might be defeated by presenting each symbol in the challenge separately after user input. For example, if the challenge is for the user to recognize and type "ABCDE", the registration process might first shown an "A", then wait for the user to enter an "A", then show a "B", wait for the user to enter a "B", and so on. A process implemented in that way would be incompatible with an infrastructure that assumes that HIP challenges are presented all at once as a single unit.

The foregoing are merely some examples assumptions that an infrastructure might make concerning how a HIP challenge is presented. Such an infrastructure might be built on other assumptions, and could similarly be defeated by presenting a HIP challenge in a way that is incompatible with those assumptions.

Another aspect of a spammer infrastructure 110 is a botnet 206, as well as how labor in the botnet is used and divided up among the various machines (block 208). As noted above, service abusers often use malware (a "bot") that has been installed on the machines of unsuspecting users. The bots are able to perform certain types of actions for spammers, until they are detected and removed. There are practical limitations on what a bot can be used for. For example, using a bot to perform a computationally intensive task, such as performing character recognition on a HIP challenge, risks undermining the stealth of the bot and revealing, to the owner of a computer, that the computer has been infected. Thus, bots are often designed to collect information that can be processed elsewhere. When bots are designed to capture a HIP challenge so that the challenge can be solved by a remote server or by human solvers, bots are acting in accordance with this principle. However, there are countervailing limitations on how much of a registration process can be performed outside of the bot. For example, a bot might capture an HIP challenge and sent the challenge to another location to be solved. That other location might then send the solution to the registration server. However, if the registration server insists that the solution come from the same place as the initial registration request, then this aspect of the registration process is incompatible with the way in which the spammer's infrastructure divides labor between bots and other sources.

Figure 2:
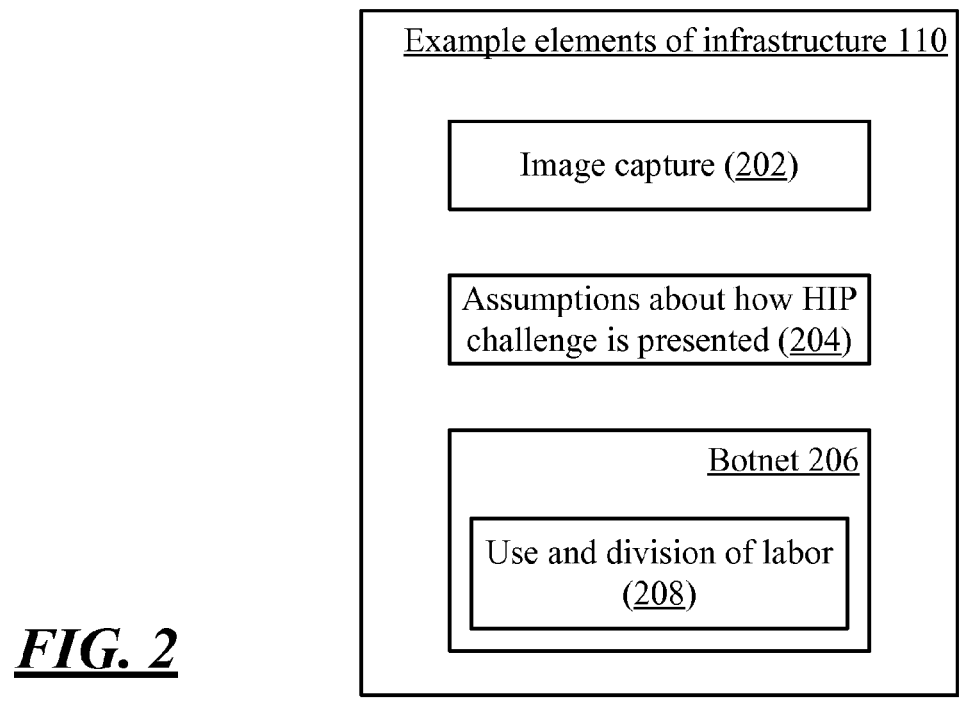
FIG. 2 is a block diagram of some example elements of a spammer's infrastructure.
Figure 3:
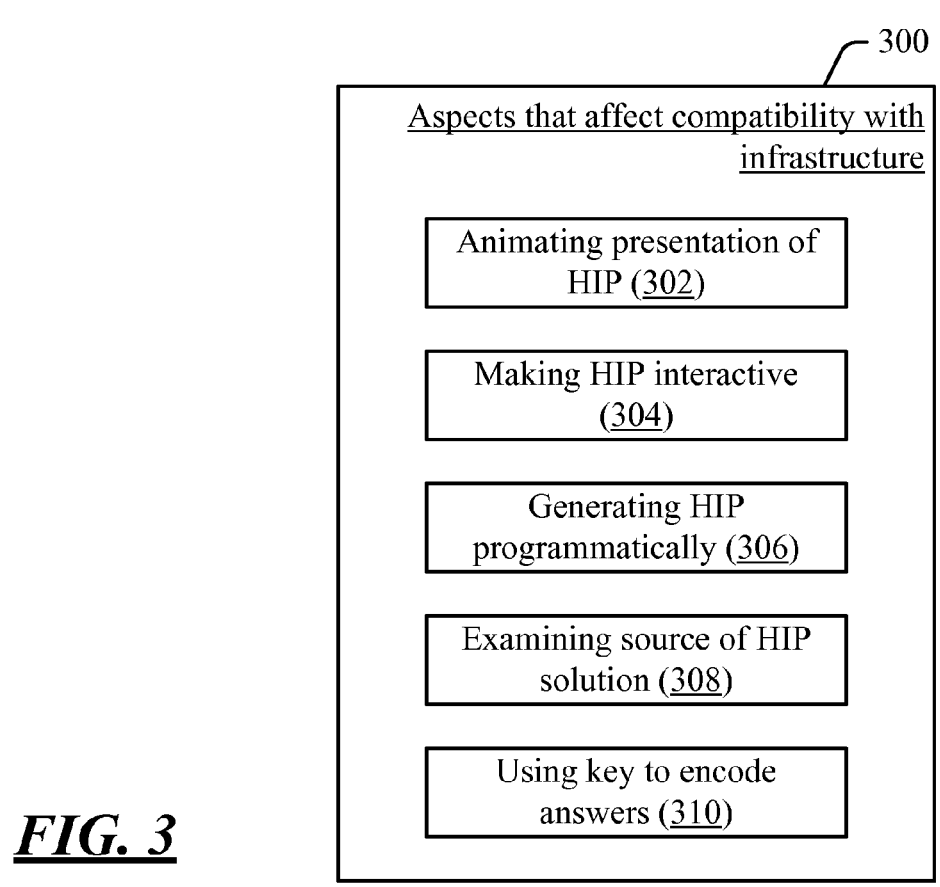
FIG. 3 is a block diagram of some example ways in which aspects of a registration procedure can be configured and/or changed in to affect compatibility between the registration procedure and a spammer's infrastructure.

The examples discussed above in connection with FIG. 2 are merely intended to illustrate various aspects of a spammer's infrastructure. There may be many other aspects to the infrastructure (and correspondingly many ways in which a registration procedure can be made incompatible with that infrastructure). FIG. 3 shows some example ways (300) in which aspects of a registration procedure can be configured and/or changed in to affect compatibility between the registration procedure and a spammer's infrastructure.

One aspect of a registration process may be to animate the presentation of a HIP challenge (block 302). As discussed above, a spammer infrastructure may be designed to capture HIP challenges on the assumption that these challenges are in the form of still images. Animating the challenge (e.g., presenting the challenge in the form of a video) is incompatible with infrastructures that operate on the assumption that the challenge is presented as a still image.

Another aspect of a registration process may be to make an HIP challenge interactive (block 304). A HIP challenge might be revealed in stages, so that a user is shown a portion of the challenge, submits part of the answer, is then shown the next part of the challenge, submits the next part of the solution, and so on. If a spammer infrastructure is designed on the assumption that the entire HIP challenge can be captured at once and transported to another site, then a HIP challenge that is revealed in stages, or that involves some type of user interaction, is incompatible with this infrastructure.

Another aspect of a registration process may be to generate the image of the HIP challenge programmatically (block 306). For example, the image or video that contains the HIP challenge might be produced by JavaScript, or some other type of code, embedded in a web page. The code might be obfuscated, thereby making it difficult to analyze. The spammer's infrastructure might be expecting to capture the HIP challenge as a single GIF or JPEG image. If the image is generated by a program that executes in a browser, then the generation of an image is incompatible with this infrastructure since the infrastructure might lack a virtual machine to execute the code and to reconstruct the image.

Another aspect of a registration process may be to examine the source of an HIP solution (block 308). As noted above in connection with FIG. 1, some spammer infrastructures might use a "bot" on an infected machine to initiate a registration procedure, and then transport a HIP challenge elsewhere to be solved. The solution may then come from the place where the challenge was solved, rather than from the bot itself. If the registration process insists that the solution come from the same location from which the registration was initiated, then the registration process is incompatible with an infrastructure that initiates the registration on a bot and solves the HIP challenge somewhere else.

Another aspect of a registration process may be to use a key (or other type of code) to encode answers (block 310). For example, the registration process might download a page to the registrant's machine, where the page includes some code to exchange keys with the server. The keys may be shared between the server and the registrant's machine, but not with other machines. When the registrant submits the solution to a HIP challenge, the solution could be encoded with a key. However, since some spammer infrastructures use a bot to download the registration page and then use another machine to send the solution to the HIP challenge, the other machine will not know the key with which to encode the solution. The infrastructure could, in theory, be designed to discover the key on the bot, and then transport the key to the solver. However, many spammer infrastructures may lack the ability to recover the key, and are thus incompatible with a registration process that creates a key during the registration session and uses the key to send the solution to a HIP challenge.

There are various ways to use the aspects of the registration process described in FIG. 3. However, one example way—which combines several of those aspects—is as follows: A HIP challenge may be implemented on the registration page in the form of JavaScript. The actually symbols to be shown to the user may be displayed in stages. Initially, the first stage is displayed. One or more other stages of the challenge are either hidden, or are displayed incorrectly. For example, if the actual challenge is "ABCDEF", then the script might display only the "AB", and might obscure the "CDEF" in some manner. For example, the CDEF might appear illegible, or jumbled; or, other letters or numbers that are not part of the solution to the challenge might be shown in place of "CDEF".

When the user enters the A and B correctly, the JavaScript may use a code received from the server to encode the "AB" portion of the answer. The server may insist on receiving this code as a condition of accepting the answer, since knowledge of the code proves that the server is communicating with the machine to which the server provided the code. The registrant's machine and the server may then perform a new key exchange, which may be used as input to the JavaScript to allow the second part of the challenge to be displayed. In this way, the second part of the challenge is displayed in response to the user's having correctly submitted the answer to the first part, and in response to a particular code exchange having taken place. For example, the code might describe how to unjumble a jumbled part of the challenge, thereby allowing the JavaScript to reveal the "CD" part of the challenge. The user then enters the C and the D, thereby causing the JavaScript to exchange another code with the server to reveal the "EF" part of the challenge. The JavaScript itself may be obfuscated, in order to complicate analysis as to how it is exchanging codes, and how it is using the codes to reveal the challenge. This example process combines the use of programmatically displayed challenges (block 306), interactive challenges (block 304), the use of keys (block 310), and animation of the challenge (block 302).

Figure 4:
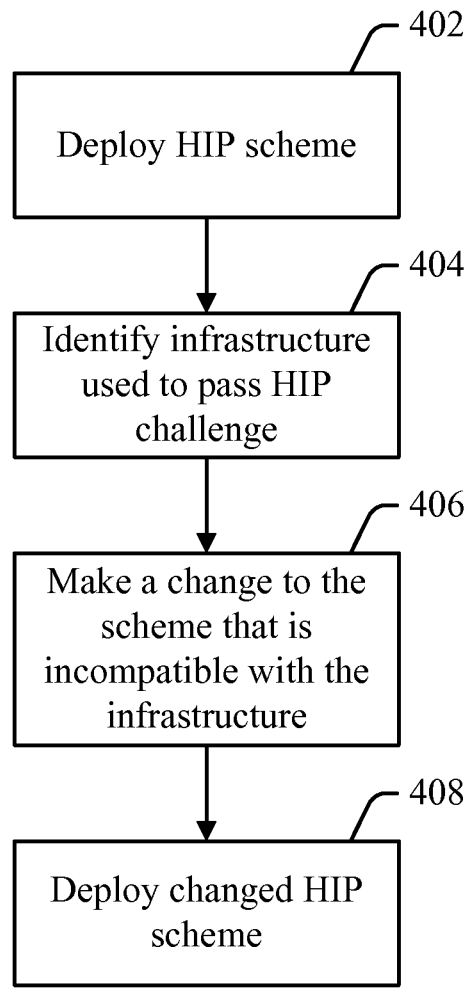
FIG. 4 is a flow diagram of an example process in which service registration process may be made incompatible with a spammer's infrastructure.

FIG. 4 shows, in the form of a flow chart, an example process in which a service registration process may be made incompatible with a spammer's infrastructure. Before turning to a description of FIG. 4, it is noted that the flow diagram contained in FIG. 4 is described, by way of example, with reference to components shown in FIGS. 1-3, although this process may be carried out in any system and is not limited to the scenarios shown in FIGS. 1-3. Additionally, the flow diagram in FIG. 4 shows an example in which stages of a process are carried out in a particular order, as indicated by the lines connecting the blocks, but the various stages shown in this diagram can be performed in any order, or in any combination or sub-combination.

At 402, an HIP scheme may be deployed as part of a registration process. For example, a registration web page for a web mail account might contain fields to be filled out (e.g., name, address, the requested mail alias, etc.). Somewhere on the page a HIP challenge may be presented. The challenge may, for example, display distorted or obscured letters and ask the user to type the letters shown. A user enters a solution to the challenge presented. The user may then be allowed to register for the service based on a determination that the solution entered is correct.

After the HIP scheme has been in place for some time, it may be determined that the scheme has been broken by spammers or other abusers. That is, it may be discovered that spammers are using accounts with the service at a large scale, thereby suggesting that the spammers have found ways to pass the HIP challenges efficiently. In order to defeat future use of the service by spammers, at 404 the particular infrastructure that is used to pass the HIP challenge is identified. Identifying the nature of the infrastructure that is being used may involve actual research into the spammer's techniques, or merely surmising what the techniques are, or some combination of research and surmise. Regardless of how the nature of the infrastructure is identified, a change may be made to the HIP scheme in order to make the scheme in some way incompatible with some known or suspected aspect of the spammer's infrastructure (at 406). Example aspects of an infrastructure, and example ways in which a registration process can be made incompatible with that infrastructure, are shown in FIGS. 2 and 3 and are discussed above.

Once the changes are made, the changed scheme is deployed at 408. Deployment of the changed HIP scheme may involve using the newly changed HIP scheme on the registration page for a web service.

Figure 5:
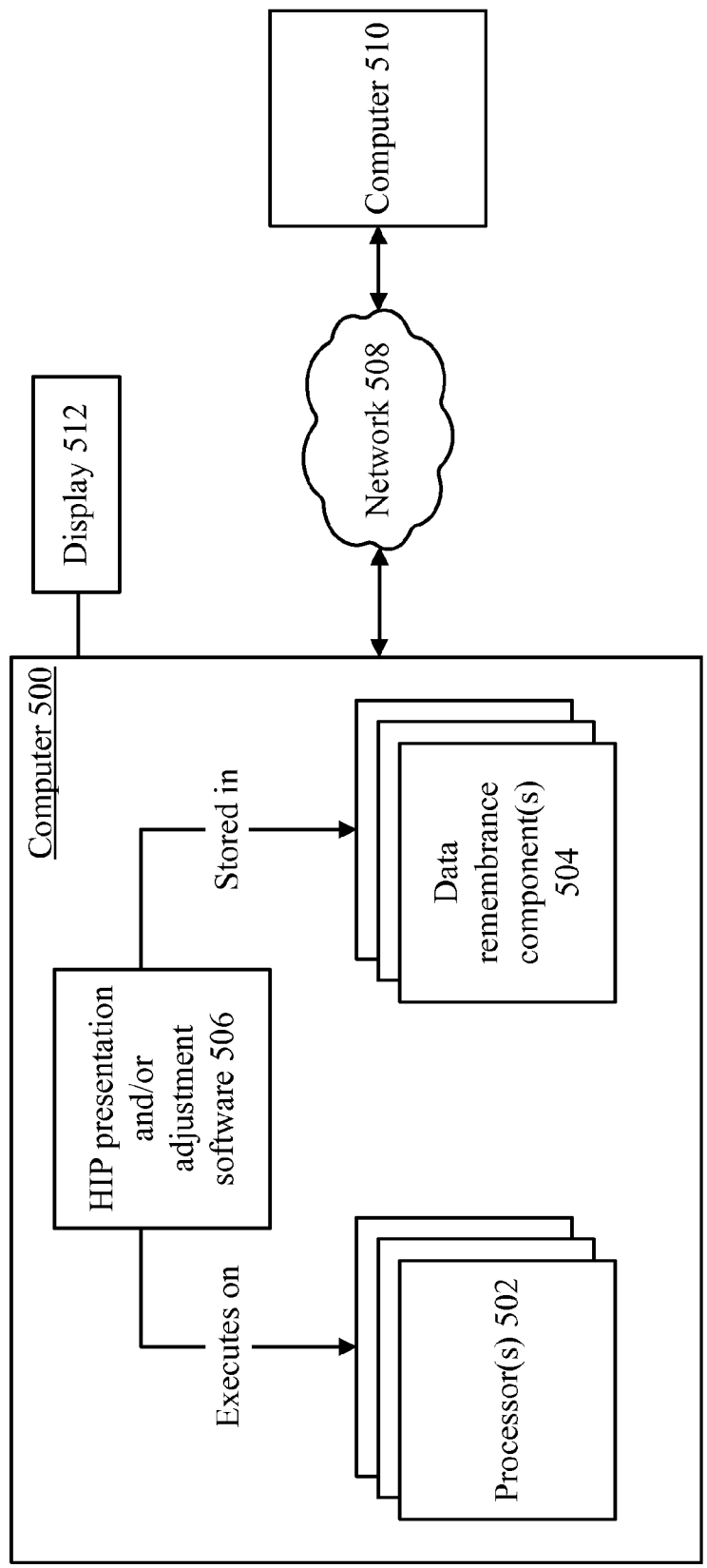
FIG. 5 is a block diagram of example components that may be used in connection with implementations of the subject matter described herein.

FIG. 5 shows an example environment in which aspects of the subject matter described herein may be deployed.

Computer 500 includes one or more processors 502 and one or more data remembrance components 504. Processor(s) 502 are typically microprocessors, such as those found in a personal desktop or laptop computer, a server, a handheld computer, or another kind of computing device. Data remembrance component(s) 504 are components that are capable of storing data for either the short or long term. Examples of data remembrance component(s) 504 include hard disks, removable disks (including optical and magnetic disks), volatile and non-volatile random-access memory (RAM), read-only memory (ROM), flash memory, magnetic tape, etc. Data remembrance component(s) are examples of computer-readable storage media. Computer 500 may comprise, or be associated with, display 512, which may be a cathode ray tube (CRT) monitor, a liquid crystal display (LCD) monitor, or any other type of monitor.

Software may be stored in the data remembrance component(s) 504, and may execute on the one or more processor(s) 502. An example of such software is HIP presentation and/or adjustment software 506, which may implement some or all of the functionality described above in connection with FIGS. 1-4, although any type of software could be used. Software 506 may be implemented, for example, through one or more components, which may be components in a distributed system, separate files, separate functions, separate objects, separate lines of code, etc. A computer (e.g., personal computer, server computer, handheld computer, etc.) in which a program is stored on hard disk, loaded into RAM, and executed on the computer's processor(s) typifies the scenario depicted in FIG. 5, although the subject matter described herein is not limited to this example.

The subject matter described herein can be implemented as software that is stored in one or more of the data remembrance component(s) 504 and that executes on one or more of the processor(s) 502. As another example, the subject matter can be implemented as instructions that are stored on one or more computer-readable storage media. Tangible media, such as an optical disks or magnetic disks, are examples of storage media. The instructions may exist on non-transitory media. Such instructions, when executed by a computer or other machine, may cause the computer or other machine to perform one or more acts of a method. The instructions to perform the acts could be stored on one medium, or could be spread out across plural media, so that the instructions might appear collectively on the one or more computer-readable storage media, regardless of whether all of the instructions happen to be on the same medium.

Additionally, any acts described herein (whether or not shown in a diagram) may be performed by a processor (e.g., one or more of processors 502) as part of a method. Thus, if the acts A, B, and C are described herein, then a method may be performed that comprises the acts of A, B, and C. Moreover, if the acts of A, B, and C are described herein, then a method may be performed that comprises using a processor to perform the acts of A, B, and C.

In one example environment, computer 500 may be communicatively connected to one or more other devices through network 508. Computer 510, which may be similar in structure to computer 500, is an example of a device that can be connected to computer 500, although other types of devices may also be so connected.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of preventing an abuser from gaining access to a service, the method comprising:
    using a processor to perform acts comprising:
        identifying a feature of an infrastructure that a spammer uses to register for said service;
        presenting a registration page that allows a user to register for said service;
        including, in said registration page, a Human Interaction Proof (HIP) challenge, wherein said HIP challenge comprises an aspect that is incompatible with said feature in that said feature prevents said infrastructure from receiving said HIP challenge;
        determining that said user has solved said HIP challenge; and
        based on said determining, allowing said user to register for said service.

2. The method of claim 1, wherein said feature comprises an ability to capture still images on a machine and to transfer captured images to a location remote from said machine, and wherein said aspect comprises presenting said HIP challenge as a non-still image.

3. The method of claim 1, wherein said feature comprises an ability to capture images in an image format on a machine and to transfer captured images to a location remote from said machine, and wherein said aspect comprises including, in said registration page, a program that executes on a browser of said user to produce an image of said HIP challenge.

4. The method of claim 1, wherein said feature comprises:
    use of a bot on a first machine to initiate a process of registering for said service and to capture said HIP challenge; and
    an ability to send, from a second machine to a registration server, a solution to said HIP challenge, wherein said second machine is distinct from said first machine;
and wherein said aspect comprises insisting that said solution be received from the same machine that initiates said process of registering.

5. The method of claim 1, wherein said feature comprises capturing said HIP challenge as a single image, and wherein said aspect comprises revealing said image in plural stages.

6. The method of claim 1, wherein said feature comprises an ability to capture said HIP challenge without use of a code that is shared between a machine that initiates a registration process and a server that provides said registration page, and wherein said aspect comprises using a code as part of presenting said HIP challenge or as part of sending a solution to said HIP challenge.

7. The method of claim 1, wherein said HIP challenge is presented by:
including, in said page, a program that reveals a first portion of said HIP challenge, wherein said program exchanges a code with a server and uses said code to transmit a solution to said first portion, whereupon a second portion of said HIP challenge is revealed only in response to transmitting a correct solution, with said code, to said server.

8. One or more computer-readable storage devices that store executable instructions to prevent an abuser from gaining access to a service, wherein said executable instructions, when executed by a computer, cause the computer to perform acts comprising:
identifying a feature of an infrastructure that an entity uses to register for said service;
including, in a registration page for said service, a Human Interaction Proof (HIP) challenge, wherein said HIP challenge comprises an aspect that is incompatible with said feature in that said feature prevents said infrastructure from receiving said HIP challenge;
receiving, from a user, a solution to said HIP challenge; and
allowing said user to register for said service based on a determination that said user has solved said HIP challenge.

9. The one or more computer-readable storage devices of claim 8, wherein said feature comprises an ability to capture still images on a machine, and wherein said aspect comprises presenting said HIP challenge as a non-still image.

10. The one or more computer-readable storage devices of claim 8, wherein said feature comprises an ability to capture images in an image format on a machine, and wherein said aspect comprises including, in said registration page, a program that executes on a browser of said user to produce an image of said HIP challenge.

11. The one or more computer-readable storage devices of claim 8, wherein said feature comprises:
use of a bot on a first machine to initiate a process of registering for said service and to capture said HIP challenge; and
an ability to send, from a second machine to a registration server, a solution to said HIP challenge, wherein said second machine is distinct from said first machine;
and wherein said aspect comprises insisting that said solution be received from the same machine that initiates said process of registering.

12. The one or more computer-readable storage devices of claim 8, wherein said feature comprises capturing said HIP challenge as a single image, and wherein said aspect comprises revealing said image in plural stages.

13. The one or more computer-readable storage devices of claim 8, wherein said feature comprises an ability to capture said HIP challenge without use of a code that is shared between a machine that initiates a registration process and a server that provides said registration page, and wherein said aspect comprises using a code as part of presenting said HIP challenge or as part of sending a solution to said HIP challenge.

14. The one or more computer-readable storage devices of claim 8, wherein said acts further comprise:
including, in said page, a program that reveals a first portion of said HIP challenge, wherein said program exchanges a code with a server and uses said code to transmit a solution to said first portion, whereupon a second portion of said HIP challenge is revealed only in response to transmitting a correct solution, with said code, to said server.

15. A system for preventing an abuser from gaining access to a service, the system comprising:
a memory;
a processor; and
a component that is stored in said memory and executes on said processor, that identifies a feature of an infrastructure that a spammer uses to register for said service, presenting a registration page that allows a user to register for said service, that includes, in said registration page, a Human Interaction Proof (HIP) challenge, wherein said HIP challenge comprises an aspect that prevents said infrastructure from being used to receive HIP challenge or a portion thereof, and that allows said user to register for said service based on a determination that said user has solved said HIP challenge.

16. The system of claim 15, wherein said feature comprises an ability to capture still images on a machine and to transfer captured images to a location remote from said machine, and wherein said aspect comprises presenting said HIP challenge as a non-still image.

17. The system of claim 15, wherein said feature comprises an ability to capture images in an image format on a machine and to transfer captured images to a location remote from said machine, and wherein said aspect comprises including, in said registration page, a program that executes on a browser of said user to produce an image of said HIP challenge.

18. The system of claim 15, wherein said feature comprises:
use of a bot on a first machine to initiate a process of registering for said service and to capture said HIP challenge; and
an ability to send, from a second machine to a registration server, a solution to said HIP challenge, wherein said second machine is distinct from said first machine;
and wherein said aspect comprises insisting that said solution be received from the same machine that initiates said process of registering.

19. The system of claim 15, wherein said feature comprises capturing said HIP challenge as a single image, and wherein said aspect comprises revealing said image in plural stages.

20. The system of claim 15, wherein said HIP challenge is presented by:
including, in said page, a program that reveals a first portion of said HIP challenge, wherein said program exchanges a code with a server and uses said code to transmit a solution to said first portion, whereupon a second portion of said HIP challenge is revealed only in response to transmitting a correct solution, with said code, to said server.

* * * * *